United States Patent [19]

Yamane et al.

[11] 4,299,534
[45] Nov. 10, 1981

[54] GUIDE VANE PROTECTING DEVICE

[75] Inventors: Yoichi Yamane; Tutomu Kamata; Hiromu Ohonaka, all of Hitachi; Mituo Takase, Mito, all of Japan

[73] Assignee: Hitachi, Ltd., Tokyo, Japan

[21] Appl. No.: 86,338

[22] Filed: Oct. 19, 1979

[30] Foreign Application Priority Data

Oct. 20, 1978 [JP] Japan .................. 53-128467

[51] Int. Cl.³ .................. F03B 3/18; F01D 17/16
[52] U.S. Cl. .................. 415/9; 64/28 R; 415/165
[58] Field of Search .............. 64/28 R; 415/156, 163, 415/160, 164, 165, 9

[56] References Cited

U.S. PATENT DOCUMENTS

| | | | |
|---|---|---|---|
| 1,517,896 | 12/1924 | Enz | 415/9 |
| 3,007,628 | 11/1961 | Nichols | 415/163 X |
| 3,030,072 | 4/1962 | Boyd | 415/163 X |
| 3,060,706 | 10/1962 | Hess | 415/9 X |
| 3,920,351 | 11/1975 | Grubb | 415/163 |
| 3,982,847 | 9/1976 | Kawase et al. | 415/9 |
| 4,040,766 | 8/1977 | Sekido et al. | 64/28 R X |
| 4,050,844 | 9/1977 | Miller et al. | 415/9 X |

FOREIGN PATENT DOCUMENTS

| | | | |
|---|---|---|---|
| 54-133236 | 10/1979 | Japan | 415/9 |
| 55-1475 | 1/1980 | Japan | 415/9 |

*Primary Examiner*—Everette A. Powell, Jr.
*Attorney, Agent, or Firm*—Thomas E. Beall, Jr.

[57] ABSTRACT

A guide vane protecting device for use in a hydraulic turbine. The device has a braking system having a first and a second braking members by which an initial braking power is imparted to a first control member interposed therebetween. The braking system further has a translational sliding mechanism which permits the translational sliding movement of the first braking member onto the first control member so so to cause a uniform increase of the braking force exerted by the braking members on the first control member, when a weakened pin incorporated in the protecting device is broken by an extraordinary force caused by, for example, jamming of foreign matter between adjacent guide vanes.

4 Claims, 5 Drawing Figures

GUIDE VANE PROTECTING DEVICE

BACKGROUND OF THE INVENTION

The present invention relates to a device for protecting guide vanes of hydraulic machines such as hydraulic turbine, particularly Francis turbine, Deriaz turbine and propeller type hydraulic turbines, as well as pump turbine of the same type. More particularly, the invention is concerned with a device for protecting the guide vanes of hydraulic machines of the kind mentioned above, against the breakage due to mutual collision of the guide vanes which take places when one or more guide vanes are freed to oscillate freely by the force of water pressure due to breakdown of weakened pins as a result of jamming of foreign matters in the guide vanes.

When a foreign matter is caught between two or more guide vanes or between the end of a guide vane and a stay vane of a hydraulic turbine during the running, the guide vanes are prevented from rotating.

In order to permit the separation of these guide vanes not rotatable from the controlling link mechanism, these vanes are connected to the link mechanism through weakened pins. When an extraordinarily large force is generated in the guide-vane operation mechanism, the weakened pin is broken at its weak point thereby to protect the guide-vane operation mechanism against the breakdown. After the breakage of the weakened pin, the guide vane or vanes separated from the guide-vane operation mechanism are freely rotated by the hydraulic action to vibrate in a flapping or rattling manner.

In order to overcome this flapping vibration of the separated guide vanes, it has been proposed to use a resilient or elastic washer which produces a braking or damping force. This, however, cannot provide an effective braking or damping force.

SUMMARY OF THE INVENTION

According to an aspect of the invention, there is provided a guide vane protecting device having a first control member and a first and a second braking members contacting the first control member. A small braking preload is imparted to the first control member by the first and second braking members. Braking means having a translational overlaying mechanism which permits the first braking member to translationally move to overlie the first control member, when the weakened pin is broken due to a jamming of foreign matters in such a manner as to cause a uniform increase of resistance force in the first control member and the first and second braking members, without hindering the mutual movement between the control member and the braking members. This arrangement permits also an easy replacement of the broken weakened pin.

Namely, it is an object of the invention to provide a guide vane protecting device comprising a link having a plurality of recesses formed in the upper surface thereof, each recess having two tapered surfaces; a seat opposing to the tapered surfaces of fitted to a coupling pin and contacting the link, the seat having a projecting tapered surface, a seat contacting the lower surface of the link and fitting to the coupling pin, and a spring adapted to produce a force acting to keep the contacting surfaces in pressure contact. The contacting surfaces are normally kept in pressure contact while the tapered surfaces of the projection and recess are positioned with a predetermined gap left therebetween. As a relative movement is caused between the members due to the breakage of the weakened pin, the opposing tapered surfaces are brought into engagement with each other so that the seat on the link makes a translational movement to come to overlie. As a result, the compression spring load is uniformly increased to effectively prevent the relative movement between the link and the coupling pin and to increase the braking force acting between the contacting surfaces.

Therefore, the preloading of the spring is so small as to be able to withstand the hydraulic action during the running of the hydraulic turbine, so that the tightening or compression of the spring during assembling is facilitated. In addition, the life of the weakened pin is prolonged because the force caused by the hydraulic action during the running of the hydraulic turbine is effectively absorbed by the surface contact between the link and the seats.

It is another object of the invention to increase the level of the pressure of the surface contact between the contacting surfaces, when the spring load is uniformly increased to increase the braking force between the contacting surfaces as a result of the translational sliding movement of the tapered surfaces after the breakage of the weakened pin. The contact pressure is limited by the materials constituting the contacting surfaces. It is possible, however, to obtain a large contact pressure and a larger coefficient of friction between the contacting surfaces, by providing a difference in the hardness between the contacting surfaces, as compared with the case in which the contacting surfaces are constituted by materials of an equal hardness. The larger contacting pressure permits the decrease of the contacting area, without imparting any damage to the contacting surfaces, to reduce the size of the link and seats. Also, the large coefficient of friction permits the reduction of the force to be generated by the spring, so that the number of spring elements such as disc springs can be reduced. For the same reason, the size of the coupling pin can be reduced.

It is still another object of the invention to facilitate the insertion of the weakened pin during the assembling and to protect the link and the coupling pin against the breakage by the broken portion of the weakened pin when the latter has been broken, thereby to minimize the time of suspension of operation of the hydraulic turbine in case of breakage of the weakened pin to minimize the recovery time.

This can be achieved by providing in the link a relief groove having a suitable depth and a width greater than the size of the weak point of the weakened pin, over the entire length of relative movement of the coupling pin, and providing a suitable difference in diameter in the weakened-pin attaching bores formed in the link and the coupling pin.

BRIEF DESCRIPTION OF THE DRAWINGS

The accompanying drawings show a preferred embodiment of the invention in which.

DESCRIPTION OF THE PREFERRED EMBODIMENT

Figure 1:
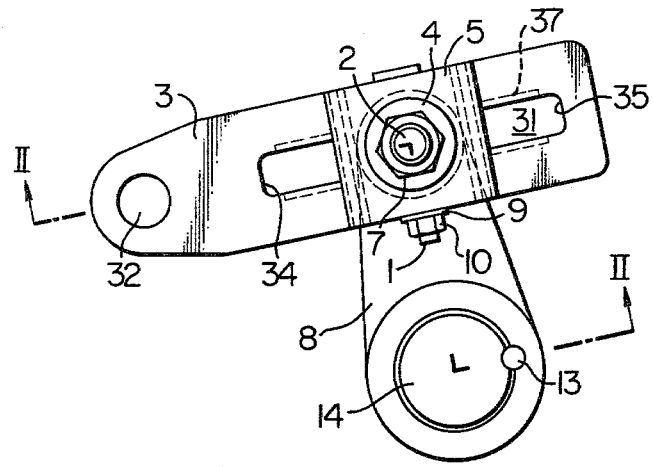
FIG. 1 is a plan view of a guide vane protecting device.
Figure 2:
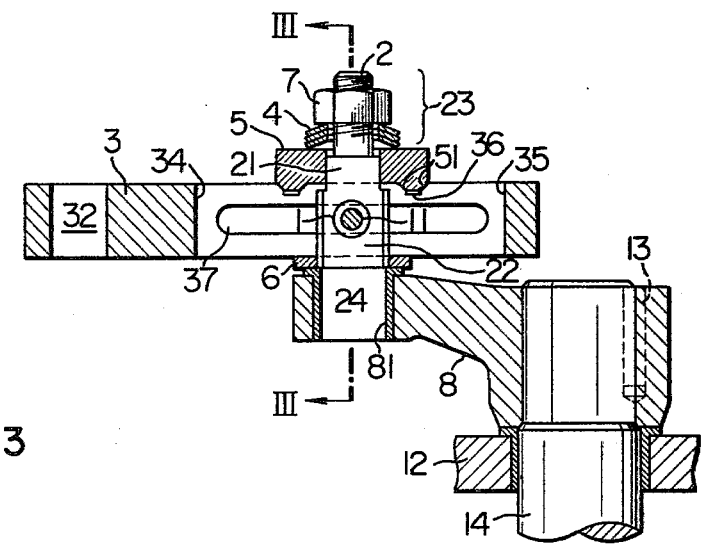
FIG. 2 is a sectional view taken along the line II—II of FIG. 1.
Figure 3:
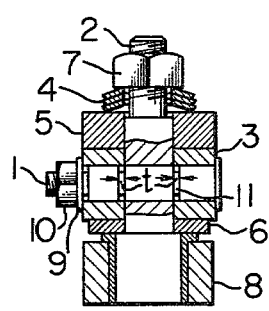
FIG. 3 is a sectional view taken along the line III—III of FIG. 2.

Hereinafter, a preferred embodiment of the invention will be described with reference to the accompanying drawings. In order to clarify the characteristics or features of the invention, the description refers also to a conventional guide vane protecting device of the same kind.

Referring to the drawings, a reference numeral 1 denotes a weakened pin having two weak points 11. When a foreign matter is caught between two or more guide vanes (not shown) or between the end of a guide vane and a stay vane (not shown) of a hydraulic turbine during the running, the guide vanes are prevented from rotating by the foreign matter. In such a case, it is necessary to the guide vane or vanes not rotatable from the controlling link mechanism. The above-mentioned weakened pin is provided for this reason.

Namely, when an extraordinarily large operation force is generated in the guide-vane operation mechanism, the weakened pin 1 is broken at one of the weak points 11 thereby to prevent the breakdown of the whole guide-vane operation mechanism. Once the weakened pin 1 is broken, the guide vane is allowed to rotate freely by the hydraulic action, so that a coupling pin 2 connected to this guide vane makes a free relative movement in a goove 31 formed in a first control member 3.

As a result of this relative movement of the coupling pin 2 in the groove 31 of the first control member 3, a frictional braking force is generated between the upper surface of the first control member 3 and a first braking member 5, and between the lower surface of the first control member and a second braking member 6, by a spring washer 4, thereby to suppress an abrupt rotation and vibration of the guide vane caused by the hydraulic action.

This conventional guide vane protecting device, however, poses the following disadvantages.

(i) This conventional device includes the braking system for preventing the relative movement between the coupling pin 2 and the first control member 3 when the weakened pin 1 is broken by an extraordinarily large force generated in the guide vane operating mechanism due to the jamming of a foreign matter which prevents the ordinary rotation of the guide vane. In this braking system, it is necessary to previously deform or preload the spring washer 4 such that it produces a force sufficiently large to press the first control member 3 and the first and second braking members 5, 6 to prevent the relative movement therebetween. Since this preload of the spring washer is considerably large, a plurality of spring washer elements are used to reduce the load applied to each element or, alternatively, a reduced number of spring washer elements having a large diameter and thickness are used.

The pressing force produced by the spring washer 4 appears as a tensile force in the coupling pin 2, so that a bending force or a shearing force is continuously applied to the weak point 11 of the weakened pin 1 through which the first control member is connected to the coupling pin 2. Therefore, the weak point 11 is liable to be plastically deformed or broken by fatigue as a result of long use, even when no jamming of foreign matter has taken place, resulting in a serious accident.

In order to withstand the large pressing force, the coupling pin 2, as well as the weak point 11 of the weakened pin 1, is required to have a large size, which in turn requires an increased size of the guide vane controller to impractically raise the cost of the device as a whole.

In addition, since the spring washer 4 is continuously subjected to an excessively large compression force, the surface thereof contacting the braking member 5 is liable to an yielding. Also, the compression force of the spring washer 4 is changed in the long use as a result of a secular change. Therefore, the initial preload of the spring washer is gradually lost during the long use. In such a case, the spring washer cannot provide the required braking force when the weakened pin has been happened to be broken due to the jamming of the foreign matter between the guide vanes.

(ii) As a measure for maintaining the compression force at a sufficiently low level and increasing the compression force in case of breakage of the weakened pin 1, tapered surfaces are formed on the ends of the first braking member as viewed in the direction of movement, while the surface of the first control member 3 is provided with a cooperating tapered surface. As the expected relative movement takes place, the tapered surface of the first braking member 5 comes into contact with the tapered surface of the first control member 3. The tapered surfaces then slide onto each other thereby to increase the pressing force.

According to this conventional measure, however, the first control member 3 and the first and second braking members 5, 6 contacting the latter are made of ferrous materials to exhibit an equal or a substantially equal hardnesses of the contacting surfaces.

The sliding of the first braking member 5 onto the tapered surface of the first control member 3 is made only at one side of the latter so that the first braking member 5 is inclined as a result of the sliding onto the tapered surface of the first control member 3. The coupling pin is loosely attached so as to be able to absorb this inclination of the first braking member 5. The coupling, however, maintains a perpendicular position irrespective of the relative movement, because it is received by the second braking member 6. Therefore, as the inclination of the first braking member 5 is increased, the spring washer 4 is also inclined to cause a change in the closeness of the contact between the spring washer elements resulting in an uneven generation of the pressing force. In such a case, the required pressing force may not be obtained.

Further, it is to be pointed out that the contacting area in the tapered surface is damaged or a seizure occurs between the two members due to a local concentration of the pressing force in that area. The damage and the welding of two members due to the seizure of course leads to a deteriorated operation of the device as a whole and a failure of the operation.

The force greater than the breaking force of the weakened pin is applied to the portion of the damage or seizure, resulting in the breakdown of the portion of the guide-vane operating mechanism other than the weakened pin or the braking member on which the seizure is taking place.

(iii) As stated in the foregoing item (ii), the first control member and the first and second braking members contacting the latter are usually made of the same ferrous material. Therefore, the maximum allowable surface contact pressure between the contacting members is limited to an impractically low level, and only a low coefficient of friction is available for suppressing the sliding between the contacting members. This can be overcome only by an increase of the contacting area and an increase of the pressing force of the spring washer, resulting in increased size of the control and braking members. Also, a larger torque is required to rotate a nut 7 which engages the thread of the coupling pin 2 to elastically deform the spring washer to preload the latter.

Figure 4:
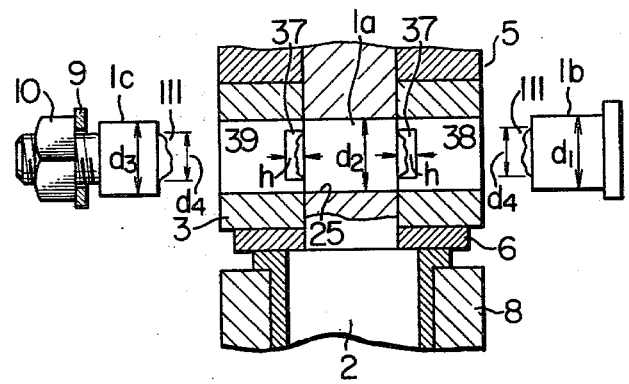
FIG. 4 is an illustration for explaining the breakage of a weakened pin.

(iv) Generally, the breakage of the weak point of the weakened pin 1 caused by an extraordinary force generated in the guide vane operating mechanism takes place after a gradual plastic deformation of the weak point. Therefore, ruggedness or projections 111 are formed in and around the fracture of the weakened pin, as shown in FIG. 4. It is considerable that this ruggedness or projections 111 bites the surface of the groove 31 of the first control member 3, as a result of the relative movement of the coupling pin 2. As the relative movement of the coupling pin 2 is further continued, scratches or other damages are formed in the surface of the groove 31 of the first control member, so that an extraordinarily large load is applied to the guid vane operating mechanism to make it impossible to maintain a smooth relative movement between the coupling pin 2 and the first control member 3.

(v) The portion of the weakened pin 1 at which it is connected to the control member and the portion of the same at which it is connected to the coupling pin 2 usually have an equal diameter ($d_1 = d_2 = d_3$). However, before the weakened pin 1 is completely broken at its weak point 11, an extraordinary force is applied to each of the portion of connection of the weakened pin 1. For this reason, also the cylindrical portions of the weakened pin 1 other than the weak point are slightly deformed. Similarly, the bores in the coupling pin 2 and the control members for receiving the cylindrical portions of the weakened pin 1 are slightly deformed into an oval shape.

Once the weakened pin 1 is broken, it is necessary to withdrawn the fractures of the weakened pin from the bores of the control member 3 and the coupling pin 2 and to insert a new weakened pin to recover the safe condition of the guide vane operating mechanism. The above-mentioned deformation of the weakened pin and the bores for receiving the latter make this replacement difficult. In some case, it is completely impossible to withdraw the fractures of the broken weakened pin.

The above described problems of the prior art are fairly overcome by the present invention as will be understood from the following description.

The guide vane operation mechanism includes a first guide vane control member in the form of a link 3 which is pivotally received by a bore 32 of a central control ring (not shown). The coupling pin 2 is received by an elongated bore 31 formed in the link 3 has a circularly machined part 22 which permits the relative movement of the coupling pin 2 with respect to the link 3, and is connected to the link 3 by means of a weakened-pin mechanism which includes a weakened pin 1 having a mechanically weakened point 11, a washer 9 and a nut 10. Braking members for contacting the upper and lower surfaces of the link 3, i.e. seats 5 and 6, are attached to the circularly machined part 22 and angularly machined part 21 of the coupling pin 2. A spring washer, i.e. a spring 4 is attached to a threaded columnar portion 23 of the coupling pin 2. As a nut 7 is screwed a vertical force is generated to press the seats 5 and 6 to the upper and lower surfaces of the link 3, thereby to provide frictional braking force between the upper surface of the link 3 and the seat 5 and between the lower surface of the link 3 and the seat 6 during the running of the hydraulic turbine.

The lower columnar portion 24 of the coupling pin 2 is rotatably received by a bore 81 formed in a second control member, i.e. a guide vane lever 8 and is loosely engaged by the coupling pin 2.

Shafts 14 are supported for free rotation in a head cover 12 of the hydraulic turbine. Each shaft carries a guide vane and is connected to the guide vane lever 8 by means of a key 13 so as to be rotated to various positions to provide the maximum efficiency of the guide vane. The shaft 14 is rotated as the guide vane lever 8 is rotated around the shaft 14.

The operating force is transmitted from the central control ring to the shaft 14 through the link 3, weakened pin 1, coupling pin 2 and the guide vane lever 8, thereby to rotate the shaft 14. When any external force is applied to prevent the rotation of the guide vane, the weakened pin 1 is broken at its weak point 11 so as to release the coupling pin 2 from the link 3. The guide vane separated from the link 3 then freely rotates by the hydraulic action to collide with adjacent guide vanes. It is therefore necessary to limit the rotation of the guide vane by providing a suitable stopper means.

In the described embodiment, the stopper means is constituted by the circularly machined part 22 of the coupling pin 2 adapted to stop and limit the rotation of the vane upon contact with one of the end surfaces 34, 35 of the elongated bore 31 of the link 3.

Braking means are provided to forcibly brake or stop the freely rotating guide vane thereby to prevent the breakage fo the adjacent guide vanes caused by a collision of the coupling pin 2 with the end surface 34 or 35 of the elongated bore 31 of the link 3.

Figure 5:
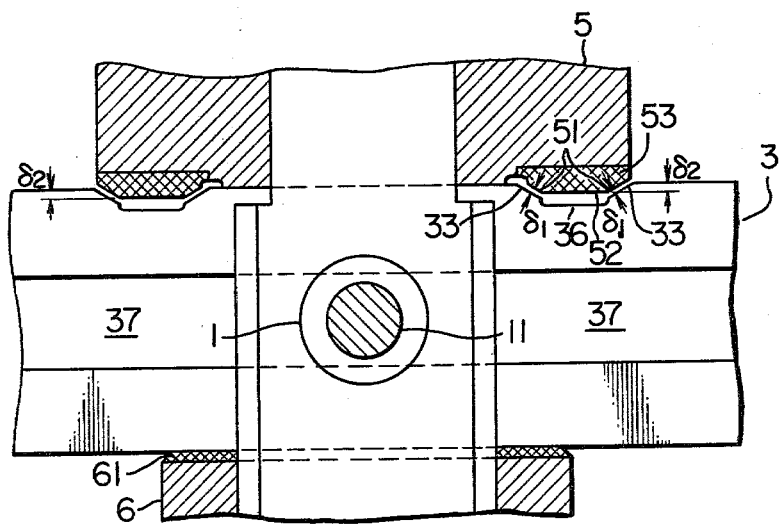
FIG. 5 is an illustration showing the detail of a braking section of the device.

FIG. 5 shows the detail of an optimum example of the braking section of the breaking means.

In the upper surface of the link 3 opposing to the seat 5, formed are recesses 36 at an equal distance from the bores 38, 39 for receiving the weakened pin 1. Each recess 36 has two inclined or tapered surfaces 33. On the other hand, the seat 5 opposing to the link 3 is provided with tapered surfaces 51 which face the tapered surfaces 33 of the link 3 with a predetermined gap $\delta_1$ left therebetween.

The seat 5 is loosely engaged by the angularly machined part 21 of the coupling pin 2, so that the predetermined gap may be maintained between the opposing tapered surfaces during the normal running of the hydraulic turbine. This guide vane braking means offers the following advantages.

When a relative movement is caused between the link 3 and the coupling pin 2 as a result of restraint of the rotation of the guide vane, each pin of the opposing tapered surfaces are brought into contact with each other as a result of the relative movement. Then, these members are parallely slided along the taper of the tapered surfaces and the seat loosely engaging the coupling pin 2 is lifted by a distance $\delta_2$ translationally keeping the horizontal posture. As a result, the compression load on the spring 4 is increased to increase the compression force at which the seats 5, 6 are pressed against the upper and the lower surfaces of the link 3, thereby to generate frictional resistance force. This frictional resistance force is increased as the seat 5 slides translationally along the tapered surface to a higher position.

The maximum frictional resistance force is obtained when the lower surface 52 of the seat has beel slided onto the upper surface of the link 3. A constant frictional resistance force is maintained thereafter, even when a further relative movement is made between the link 3 and the coupling pin 2.

Assuming here that the weakened pin has been broken due to a fatigue caused by a pulsative hydraulic action transmitted through the guide vane during normal operation of the hydraulic turbine, the rotation of the guide vane is prevented because the relative movement between the link 3 and the coupling pin 2 is effectively suppressed by the translational sliding of the seat 5.

If the weakened pin 1 is broken due to a stopping of the guide vane during the operation of the guide vane operating mechanism, the link 3 and the coupling pin 2 make a relative movement until the guide vane operating mechanism is brough to the stopping position. However, the relative movement is suppressed even in this state, because the constant fricitional resistance is maintained even at this stopping position.

The braking means provides another advantage as stated below. As mentioned before, the seats 5 and 6 contacting the link 3 have been made conventionally of a ferrous metal of the same kind as the material of the link 3. The mutual contact of the same kind of metal does not pose any problem in the ordinary state. However, as the contacting members make relative movement to increase the braking or suppression force, the surface of the seat 6 at which the latter contacts the lower surface of the link 3 is gradually damaged, as well as the surface of the seat 5 contacting the tapered surfaces of the link 3. As this braking or suppression force is increased, a seizure takes place between the contacting members, to hinder the further relative movement. If the operation force for operating the guide vanes is increased in this state, the seat 5 may be seriously damaged or broken. This is attributable to the fact that the contacting surfaces are constituted by ferrous metal or metals which cannot provide a sufficiently large contact pressure and high value of the coefficient of friction therebetween.

To avoid this, according to the invention, the contacting surface of the seat 6 for contacting the lower surface of the link 3 and the protrusions of the seat 5 having tapers adapted for contact with the upper surface of the link 3 are constituted by a metal of copper group, while the upper and lower surfaces of the link 3 are constituted by a ferrous metal, so that a difference in hardness is presented between the contacting surfaces. By so doing, the relative sliding movement along the tapered sliding surfaces to the point of the maximum frictional resistance force, in the course of breakage of the weakened pin, is made without any damage in both members. In addition, a greater contacting pressure can be developed between the contacting surfaces, and a higher value of the coefficient of friction can be obtained between the contacting surfaces, as compared with the conventional arrangement in which both of the contacting surfaces are constituted by ordinary ferrous metal or metals. This is turn permits to decrease the initial preload of the spring 4, and the reduction of the size of the whole apparatus.

Each of the seats 5 and 6 may be produced as one body of the metal of copper group. This, however, incurs a rise of the preduction cost. In case of the seat 6, thickness of the copper group metal constituting only the portion 61 surrounding the contact surface is sufficient. Similarly, in case of the seat 5, a thickness of the copper group metal constituting only the portion 51 surrounding the tapered surface is sufficient.

From the view point of the mechanical strength, the seat 5 is preferably made of a ferrous material because it is subjected to the pressing force of the spring 4 while it is in the state of a beam supported at distant two pints, when it has slided translationally to a certain height along the tapered surfaces.

Therefore, the best way for manufacturing the seats 5 and 6 is to weld the copper alloy to the ferrous base material.

A third advantage offered by this braking system is as follows.

When the guide vane operating mechanism is working with the guide vane in the state fixed against the rotation, the vane operating force is received by the weakened pin 1 through which the link 3 and the coupling pin 2 loosely received by the elongated bore 3 of the link 3 are connected. As a result, the weakened pin is broken due to yielding as illustrated in FIG. 4. The fractures of the weakened pin has ruggedness of fine irregular projections 111 or burrs. Then, as the coupling pin 2 makes a movement relatively to the link 3, the fracture 1a of the weakened pin 1a is kept unmoved and as the increase of the movement, opposing fracture surfaces are brought into contact with each other. Since the fracture surface of the fracture 1a fitting the coupling pin 2 projects toward both weakened-pin receiving bore of the link 3, the fracture surfaces at both sides of the fracture 1a scratches and damages the inner peripheral surfaces of these bores as the fracture is moved through the bores. The damage caused by the fracture surfaces is increased as the relative movement between the link 3 and the coupling pin 2 is continued. Also, the sliding surface of the coupling pin 2 loosely fitted to the bores in the link 3 may be damaged. The relative movement is seriously hindered or made impossible due to these scratches and damages.

To avoid this, a groove 37 is formed in the elongated bore 31 of the link 3. The groove 37 has a width greater than the diameter $d_4$ of the weak point of the weakened pin 1 and a depth h which is greater than the size t of the weak point, and is extended over the length of relative movement of the coupling pin 2, as will be seen from FIG. 4. By so doing, the sliding surfaces are protected against the damage caused by the projections or raggedness 111 of the fracture 1a of the weakened pin 1, so as to ensure a smooth relative movement between the link 3 and the coupling pin 2.

A fourth advantage is as follows. The weakened pin 1 has to be inserted in the course of assembling of the guide vane operating mechanism. Conventional weakened pin has a constant diameter of leading or insertion portion. It is therefore necessary that the bores in the link 3 and the bore in the coupling pin 2 are held strictly coaxially or within a small offset corresponding to the gap which provides the loose fit of the pin. Since this gap is small, the bores are likely to be offset beyond the allowable range. Therefore, for inserting the weakened pin 1 into one of the bores of the link 3 and then into the bore in the coupling pin 2, it is necessary to press the weakened pin at such a large force as would to forcibly bring these bores into alignment with each other.

As a result of this excessively large pressing force, the leading end portion of the weakened pin 1 is inconveniently pressed against the inner peripheral wall of the bore in the coupling pin 2 so that the pressed portion is damaged as the weakened pin 1 is further driven into the bore, resulting in an incorrect fitting of the weakened pin.

If the weakened pin 1 is inserted correctly, the operation force of the guide vane operating force is shared evenly by the cylindrical portions 1b, 1c of the weakened pin 1 received by the bores in the link 3. This force is then concentrated to the portion 1a of the weakened pin 1 received by the bore in the coupling pin 2. As this force is increased to an extraordinary level, the weakened pin 1 is broken at its weak portions to permit the relative movement between the link 3 and the coupling pin 2.

Since the extraordinary operating force is applied to each of the fitting surfaces, the portions of the weakened pin 1 other than the weak points, e.g. the cylindrical portions 1a, 1b, 1c, as well as the bores receiving these cylindrical portions, i.e. the bores 38, 39 in the link 3 and the bore 25 in the coupling pin 2, are slightly deformed into oval shape.

As stated before, the conventional weakened pin has a constant diameter over its length except the weak points. If such a pin is broken, it is necessary to remove the fractures of the broken pin from respective bores. It will be seen from FIG. 4 that the fractures 1b, 1c can be easily taken out from the bores even when there is slight deformation in these bores and/or in the cylindrical fractures 1b, 1c. For the removal of the central fracture 1a received by the bore 25 of the coupling pin 2, it is necessary to loosen the nut 7 to relieve the coupling pin 2 from the spring load and to bring the latter to a position where the bore 25 thereof is correctly aligned with the bores 38, 39 in the link 3, for otherwise the central fracture 1a cannot be taken out through the bore 38 or 39 in the link 3. However, in most cases, it is almost impossible to take out the central fracture 1a through the bore in the link 3, even if the bores are correctly brought into alignment with each other, because of the deformation of the fracture 1a and the bores.

According to the invention, the insertion of the weakened pin in the course of assembling, removal of the broken weakened pin and the insertion of the new weakened pin, the diameter of the cylindrical portions of the weakened pin received by the bores in the link 3 and the diameter of the cylindrical portion received by the bore of the coupling pin 2 are determined to meet the following conditions:

$$d_3 < d_2 < d_1$$

where, the symbols $d_1$, $d_2$ and $d_3$ represent the diameters as illustrated in FIG. 4. It will be apparent that the above defined condition facilitates the insertion of the weakened pin because the cylindrical portions of the weakened pin 1 make contact only with the corresponding bores during the insertion of the weakened pin. For removing the central fracture 1a from the bore in the coupling pin 2, the nut 7 is loosened to release the coupling pin 2 from the spring load and the coupling pin 2 is moved to the normal position to bring the bores into mutual alignment. It is to be noted that, in this case, there is a tolerance expressed by $d_1 - d_2$ between the axes of the bores of the link 3 and the bore of the coupling pin 2. Since the diameter $d_1$ is selected to be sufficiently greater than the diameter $d_2$, the central fracture 1a of the weakened pin 1 can be taken out of the bore of the coupling pin 2 through the bore of the link 3 without substantial difficulty, regardless of the slight deformation of the bores and the fracture.

For inserting a new weakened pin, it is necessary to bring the bores in the link 3 and the bore in the coupling pin 2 approximately into alignment with each other. This, however, can be easily achieved by making an adjustment that the gap $\delta_1$ is formed between the tapered surface 33 of the link 3 and the tapered surface 51 of the seat 5 fitting to the angularly machined part of the coupling pin 2, so that the insertion of the new weakened pin can be made much easier than in the conventional device.

What is claimed is:

1. A guide vane protecting device having: a first guide vane control member connected at its one end to a gate ring and having an elongated bore extened toward the other end thereof; a coupling pin received by said elongated bore, said coupling pin being connected at its one end to a second guide vane control member for rotating a guide vane and provided at its other end with a spring washer adapted to produce and impart a braking force to said first and second guide vane control members; and a weakened pin fixed to said first control member and adapted to permit, when broken, a movement of said coupling pin along said elongated bore; said first control member being provided at its upper surface with a plurality of recesses each of which having a pair of tapered surfaces, while said coupling pin being provided with protrusions having tapered surfaces opposing to said tapered surfaces of said first control member with a predetermined gap left therebetween; said protecting device characterized by comprising a first and a second braking members by means of which the upper and lower surfaces of said first control members being always subjected to an initial braking force; whereby, when said weakened pin is broken, said first control member and said coupling pin make a relative movement to cause a relative movement between said first control member and said first and second braking members to bring two opposing tapered surfaces into contact with each other to allow said first braking member to slide translationally onto said first control member thereby to uniformly increase the compression load of said spring washer to correspondingly increase the braking force so as to produce a braking force effective to suppress the excessive relative movement between said first control member and said coupling pin.

2. A guide vane protecting device as claimed in claim 1, wherein a difference in hardness is provided between the material constituting the braking surface of said first control member and the material constituting the braking surfaces of said first and second braking members, thereby to prevent extraordinary phenomenon such as biting or scratching on the braking surfaces.

3. A guide vane protecting device as claimed in claim 1, wherein the bore formed in said first control member and adapted for receiving said coupling pin for free relative movement is provided with a relief groove having a predetermined depth and a width greater than the size of said weakened pin, said relief groove being extended over the entire length of relative movement of said coupling pin, thereby to prevent said first control member from being damaged by the fracture of said weakened pin when said weakened pin has been broken to permit the relative movement between said first control member and said coupling pin.

4. A guide vane protecting device as claimed in claim 1, wherein a difference in diameter is provided between the weakened-pin receiving bores formed in said first control member and the weakened-pin receiving bore formed in said coupling pin, so as to facilitate the withdrawal of the broken fracture of said weakened pin or the insertion of a new weakened pin.

* * * * *